Feb. 9, 1932. J. P. JOHNSON 1,844,471
COUPLING
Original Filed Jan. 10, 1928
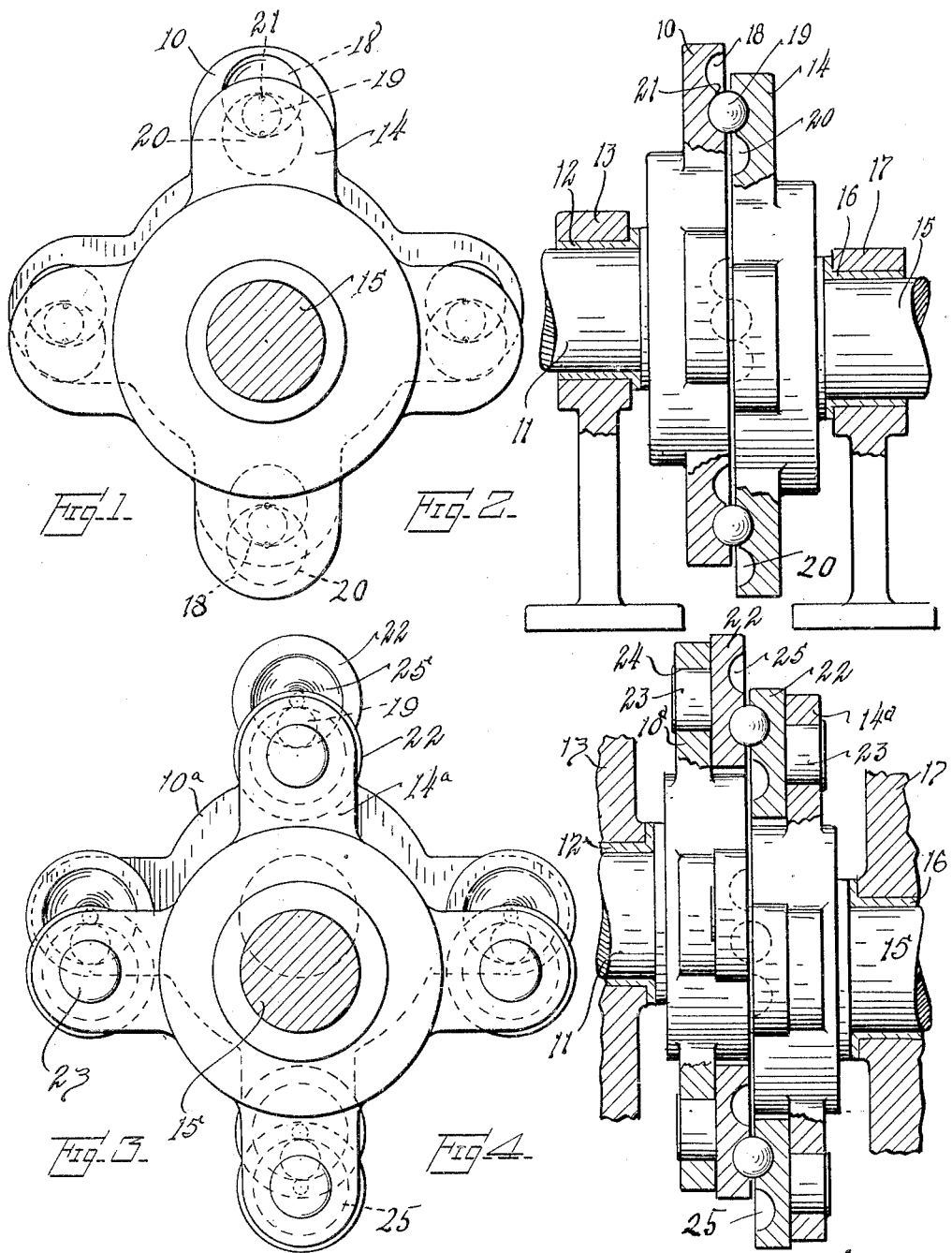

Patented Feb. 9, 1932

1,844,471

UNITED STATES PATENT OFFICE

JAMES P. JOHNSON, OF CLEVELAND, OHIO, ASSIGNOR TO THE J. P. JOHNSON ENGINEERING COMPANY, OF CLEVELAND, OHIO, A CORPORATION OF OHIO

COUPLING

Original application filed January 10, 1928, Serial No. 244,610. Divided and this application filed December 5, 1928. Serial No. 324,000.

This invention relates to couplings of the anti-friction type and has for its object to provide an anti-friction driving means between a drive member and a driven member eccentrically mounted with respect to each other and constitutes a division of my application, Serial No. 244,610, filed January 10, 1928.

Another object of the invention is to provide a new and novel anti-friction coupling for connecting a drive member and a driven member having cooperating portions rotatable about different axes.

A further object of the invention is to provide a coupling which is simple in construction, efficient in operation, and inexpensive to manufacture.

With the objects above indicated and other objects hereinafter explained in view, my invention consists in the construction and combination of elements hereinafter described and claimed.

Referring to the drawings:

Figure 1 is an elevational view of a coupling embodying the invention.

Fig. 2 is a side elevational view of the coupling shown in Fig. 1, portions of which are shown in section.

Fig. 3 is an end elevational view of a modified form of the invention.

Fig. 4 is a side elevational view of the modification shown in Fig. 3 with portions thereof broken away.

In the drawings, I have shown in detail the anti-friction coupling embodying the present invention which is adapted to be used for driving two disaligned or eccentric members at preferably the same speed where it is desirable to have a positive anti-friction driving connection.

As shown in the drawings, a disc or irregular member 10 is provided with a shaft 11 which may be formed integral therewith and of any suitable material. The shaft 11 is rotatably mounted within a bushing 12 suitably supported in a bearing 13 of any desired shape or form. A disc or irregular member 14 is provided with a shaft 15 preferably formed integral therewith and of any suitable material and is rotatably mounted within a bushing 16 supported in any suitable bearing 17, the axis of rotation of the shaft 11 being eccentric or off-center with respect to the axis of the shaft 15 and either the shaft 11 or the shaft 15 may be employed as the drive member in which case the opposite shaft is employed as the driven member.

The disc 10 is provided with circular recesses 18 any number of which may be employed although four are herein shown, these four recesses being positioned upon a common radius struck from the axis of rotation of disc 10 and preferably spaced 90° apart. The balls 19 are of any suitable diameter or size and the depth of the recesses is preferably slightly less than the radius of the balls. The disc 14 is also provided with recesses 20 any number of which may be employed, although four are herein shown, the number, however, should correspond to the number of recesses 18 provided in the disc 10. The depth of the recesses 20 is also slightly less than the radius of the balls 19 so as to provide sufficient clearance between the adjacent faces of the disc 10 and the disc 14 during rotation without interference therebetween. The recesses 20 are positioned upon the same radius and preferably spaced 90° as herein shown and are positioned with respect to the recesses 18 in such a manner that the balls 19 are adapted to engage the lower and upper adjacent portions respectively of the recesses 18 and 20. During the rotation of the discs 10 and 14, the balls 19 will have a positive rolling anti-frictional engagement with the recesses 18 and 20. In arranging the balls or bearing members of this anti-friction coupling it should be borne in mind that the cooperating discs 10 and 14 rotate about eccentric axes, the purpose of the coupling being to provide an efficient anti-friction coupling between two eccentric members, one being a drive member and the other being a driven member. In positioning the balls properly they should, of course, rotate about an axis common to both of the discs 10 and 14 and in determining the positions of the balls one-half of the distance between the axes of rotation of the eccentric members constitutes the center or axis of rotation of the balls. These balls may be of any diameter and the position of the balls depends upon the radius selected struck from the axis of rotation of the balls. Whether these balls are positioned close to the axes of rotation of either of the eccentric members 10 and 14 depends largely upon what the coupling is to be used for.

Another advantage attained in the use of a coupling of this particular character is the thrust effect which this coupling provides. It will be noted that only a single bearing 13 is required for rotatably supporting the shaft 11 to which the disc 10 is attached and only a single bearing 17 required to support the shaft 15 to which the disc 14 is attached. The cooperation between the discs 10 and 14 together with the balls 19 tend to separate under load and the bearings 13 or 16 function as thrust bearings.

It is to be noted that the recesses provided in the adjacent faces of the discs 10 and 14 are circular or continuous and provide a greater bearing surfaced for the balls 19 than if the recesses were cup-shaped as set forth in my copending application of which this application is a division. The balls 19, during the rotation of the discs 10 and 14, roll within the grooves or recesses and around the raised portion 21, substantially half of the circumference of the ball 19 being engaged. It should be further noted that by employing a recess of this particular type a positive driving connection between the discs 10 and 14 is afforded and only one recess 18 in the disc 10 and one recess 20 in the disc 14 could be provided and there would be no possibility of back lash or lost motion in the reversing in the direction of rotation of the discs 10 and 14. It will, therefore, be seen that in this arrangement of grooves and balls there is a positive driving action afforded in both directions at all times. With the use of balls as the connecting means between the discs the end thrust will be taken up without any danger of the balls tipping and at the same time the rolling action is over the entire surface of the balls.

In Figs. 3 and 4 a further modification of the coupling is shown. It might in some instances be inconvenient or impossible to grind or otherwise form the ball grooves 18 and 20 directly in the adjacent faces of the discs 10 and 14 or it may be too expensive for the purpose for which the coupling is to be used and, therefore, it is practical to make a separate ball race as indicated at 25 in Figs. 3 and 4. This preferably comprises a hardened disc 22 having reduced extensions 23 which are adapted to be pressed or otherwise secured within suitable openings 24 in the discs 10a and 14a. It will also be noted that in this arrangement the discs 22 are interchangeable in the openings of the discs 10a and 14a. The adjacent faces of the discs 22 are provided with circular recesses 25 within which the balls 26 cooperate to effect a suitable anti-friction driving connection between the discs 10a and 14a. In this construction, which is very inexpensive, it will be noted that there is no need of hardening the discs 10a and 14a as would probably be necessary in the construction shown in Figs. 1 and 2. Furthermore, it should be understood that a much greater degree of accuracy could be obtained for locating the grooves 25 and the cooperating balls 26.

While I have described the preferred embodiment of the invention, it is to be understood that I am not to be limited thereto inasmuch as many changes and modifications may be made without departing from the spirit of the invention as defined in the appended claims.

Having thus described my invention, I claim:

1. In a coupling, a drive element, a driven element rotatable eccentrically with respect to said driving element, relatively eccentric annular grooves in the adjacent faces of said elements, and a member connecting said elements and adapted to roll in said grooves.

2. In a coupling, a drive element, a driven element rotatable eccentrically with respect to said driving element, a plurality of relatively eccentric annular grooves in the adjacent faces of said elements, and members connecting said elements and adapted to roll in said grooves.

3. In a coupling, a driving element, a driven element rotatable eccentrically with respect to said driving element, members associated with the adjacent faces of said elements and provided with relatively eccentric grooves in the adjacent faces thereof, and a member disposed in said grooves and adapted to roll in said grooves.

4. In a coupling, a driving element, a driven element rotatable eccentrically with respect to said driving element, members associated with said elements and provided with relatively eccentric grooves in the adjacent faces thereof, and rolling members disposed in said grooves and adapted to drivingly connect said elements.

In testimony whereof, I hereunto affix my signature.

JAMES P. JOHNSON.